March 25, 1924.

W. H. C. LASSEN

MOTION PICTURE SCREEN

Filed Sept. 12, 1921

1,487,747

Inventor:
Waldemar H.C. Lassen.
By Howard Piehe
his Attorney.

Patented Mar. 25, 1924.

1,487,747

UNITED STATES PATENT OFFICE.

WALDEMAR H. C. LASSEN, OF ST. PAUL, MINNESOTA.

MOTION-PICTURE SCREEN.

Application filed September 12, 1921. Serial No. 499,942.

*To all whom it may concern:*

Be it known that I, WALDEMAR H. C. LASSEN, a citizen of the United States, residing at St. Paul, in the county of Ramsey and State of Minnesota, have invented a new and useful Improvement in Motion-Picture Screens, of which the following is a specification.

My invention relates to motion picture screens and has for its principal object to provide a screen formed with an exterior layer of minute glass globules adapted to reflect a greater amount of light projected upon the same than in the ordinary screen and so make a more highly illuminated picture and cut down the amount of light required to efficiently and effectively produce the results desired.

Another object of the invention is to provide a screen in which the outer layer of glass globules is formed of a slight colored tint so as to make the screen have a clear white appearance when the light is projected thereon.

A still further object is to form the screen of such material so as to make the same exceedingly pliable and flexible so that the screen may be readily rolled and placed away when it is not desired to use the same.

A still further object of the invention resides in applying a number of coatings of coloring matter to the screen each of said coatings being of a whiter and more perfect and dense coloring matter so as to form a perfectly opaque and permanent surface on which to apply the glass globules.

In carrying out my objects I provide minute glass globules with a slight amount of coloring matter which gives them a faint tint thereby making the screen have a clear white appearance when the picture is projected upon the same. In making the screen flexible I employ a fabric back which is impregnated with a soft pliable composition adapted to maintain the screen in a flexible and pliable condition throughout its life. Upon the base thus formed I successively apply coatings of coloring matter and last of all the minute glass globules which serve to give the screen the reflecting effect desired.

The full objects and advantages of my invention will appear in connection with the detailed description thereof and are particularly pointed out in the claims.

In the drawings, illustrating the application of my invention in one form:—

Figure 1:
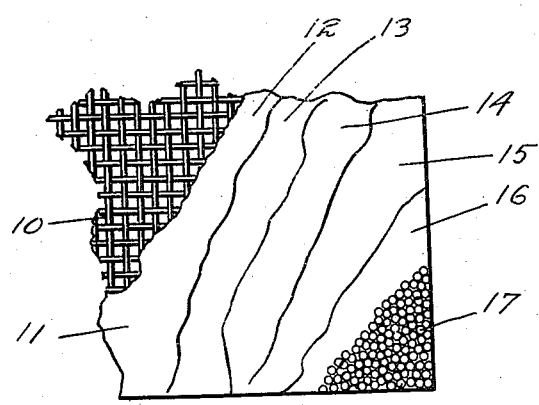
Fig. 1 is a plan view of a fragmentary portion of my improved screen drawn to a greatly enlarged scale.
Figure 2:
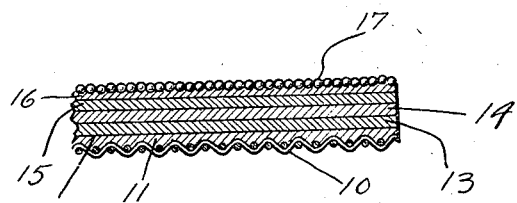
Fig. 2 is a cross sectional view of the screen shown in Figure 1 and drawn to a very large scale.

In small theaters which are used for diverse purposes and in halls and other public places in which it is often desired to display motion pictures it is frequently very desirable to have a screen which may readily be rolled up and placed out of the way when the said theater or hall is required for other purposes. In the same instances it is further necessary to have a screen which requires a minimum amount of light to illuminate the same inasmuch as the light source is frequently found in small theaters and halls to be of insufficient capacity to give the illumination required. It is further frequently desirable that the screen show a perfectly white reflection and it is to these ends that my invention is provided.

In the construction of my improved screen I use a fabric backing indicated at 10 which may be of cotton, linen or any other desired material depending upon the quality of the screen which it is desired to manufacture. This back is preferably formed of material which is very soft and which will stand a great deal of sharp bending and rolling without breaking or pulling to pieces. Upon the face of the backing 10 I apply a filler or body portion 11 which is applied directly to the surface of the back 10 and permitted to soak into the same so that the said back becomes thoroughly impregnated with this material. This body consists of ordinary commercial bees wax mixed with white paint of an inexpensive nature. The wax is first melted to a liquid state and then gradually poured into the paint, being constantly stirred and mixed throughout this operation. The body member thus formed is permitted to thoroughly dry before the next coating is applied and serves to bind the back 10 firmly together and to form a perfectly even and uniform surface on the top of the same as indicated at 12, filling up all of the crevices and depressions in said back. This construction makes an elastic and pliable base which may be readily rolled and folded on which the coloring coatings and the glass globules may be applied.

Upon the surface 12 of the body member 11 is applied a number of coloring coats 13, 14, 15 and 16. The first coat 13 consists of white pigment, varnish, linseed oil, drier and French turpentine. This coat is stippled and permitted to remain until thoroughly set and dry. Upon coat 13, after the same is thoroughly dry, I apply in a similar manner the second coating of coloring material 14 which consists of flax seed oil, standard zinc, and French turpentine. This coating is also permitted to dry similar to coating 13 and the third coating of coloring matter indicated at 15 applied which consists of white pigment, raw linseed oil, and japan drier. When this last coat is thoroughly dried I employ a final coating 16 of a high grade white enamel which may consist of egg shell white, raw linseed oil, japan drier, French turpentine, and standard zinc white. This last coat is applied fairly thin and is well brushed out to a uniform thickness.

After the last coating 16 has been applied the same is permitted to stand for about twenty minutes until the same has been partially set and possesses an adhesive characteristic. When this condition occurs the entire screen is covered over with a layer of minute glass globules 17 which are carefully sifted on with a fine sieve. The whole screen is then permitted to set until the last coating which consists of the white enamel coating is thoroughly dried and firmly set. When this has taken place it will be found that the glass globules are partially imbedded within the enamel coating and have become firmly attached to the screen proper. Although there are many forms and sizes of glass globules used for the manufacture of such screens I employ a form which is substantially globular in formation and which is of clear glass. This form of glass product is frequently known in the commercial world as glass sand, the same being somewhat finer than the product known as glass pearls. It can readily be understood however, that any of the other forms may be used if desired.

It will be noted that in the successive coatings 13, 14, 15 and 16 of the screen proper that each of the grades of white pigment used in the preparation of the respective coatings is of a higher quality the nearer the surface of the screen the same occurs. This has the effect of producing a perfectly opaque and an exceedingly white background on which to apply the glass globules previously referred to.

For producing the whiteness of appearance and the reflection of the image from the motion picture projector I employ glass globules which are formed of a composition of glass having a slight tint of coloring matter in the same. This coloring matter may be of a light blue or an amethyst hue or the same may be made of such a tint as to assist in producing the particular color rays of which the light source may be deficient so as to give a pure white appearance when the image is cast upon the screen.

I have found that with screens constructed as above described that the same may be used continuously for years, the said screens being rolled up and set aside as frequently as desired. I have further found that by applying the coatings of coloring matter as described and by employing the tinted glass globules that an exceedingly clear and white picture is provided.

In accordance with the patent statutes I have described the principles of operation of my invention together with the apparatus which I now consider to represent the best embodiment thereof, but I desire to have it understood that the construction shown is only illustrative and that the invention can be carried out by other means and applied to uses other than those above set forth within the scope of the following claims.

I claim:—

1. A motion picture screen comprising a fabric backing, an impregnation of highly elastic and pliable material applied to said backing comprising bees wax and white paint, a first coating of coloring material applied to said impregnation comprising white pigment, varnish, linseed oil, drier and French turpentine, a second coating of coloring matter comprising flax seed oil, standard zinc, French turpentine, a third coating of white coloring matter comprising white pigment, raw linseed oil, and drier, a coat of white enamel comprising egg-shell white, raw linseed oil, drier French turpentine, and standard zinc white, and a layer of glass particles partially imbedded in and applied to said coating of white enamel.

2. A motion picture screen comprising a fabric backing, an impregnation of highly elastic and pliable material applied to said backing comprising bees wax and white paint, a number of coloring coatings applied to said impregnation and a layer of glass particles applied to the outer of said coloring coatings.

In testimony whereof I affix my signature.

WALDEMAR H. C. LASSEN.